United States Patent
Antonakopoulos et al.

(10) Patent No.: US 7,245,575 B2
(45) Date of Patent: Jul. 17, 2007

(54) DATA OVERWRITING IN PROBE-BASED DATA STORAGE DEVICES

(75) Inventors: Theodore Antonakopoulos, Patras (GR); Evangelos Eleftheriou, Zurich (CH); Charalampos Pozidis, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 10/723,153

(22) Filed: Nov. 26, 2003

(65) Prior Publication Data

US 2004/0114490 A1   Jun. 17, 2004

(30) Foreign Application Priority Data

Nov. 28, 2002 (EP) ............................... 024060337

(51) Int. Cl.
*G11B 7/0045* (2006.01)
(52) U.S. Cl. ..................................... 369/126; 369/59.24
(58) Field of Classification Search ................ 369/126, 369/59.24, 100
See application file for complete search history.

(56) References Cited

U.S. PATENT DOCUMENTS 7,099,257 B2 * 8/2006 Antonakopoulos et al. ........................ 369/59.24

OTHER PUBLICATIONS

P. Vettiger et al., *The "Millipede"—More than One Thousand Tips for Future AFM Data Storage*, IBM J. Res. Develop., vol. 44, No. 3, May 3, 2000, pp. 323-340.
E. Eleftheriou, *Signal Processing and Coding for Data Storage: State of the Art and Future Trends*, IEEE Communications Theory Workshop 2002, Sanibel Island, FL, May 19-22, 2002.

* cited by examiner

*Primary Examiner*—Nabil Hindi
(74) *Attorney, Agent, or Firm*—Michael F. Morano; F. Chau & Associates, LLC

(57) ABSTRACT

Methods and apparatus are provided for overwriting data in a probe-based data storage device in which data bits are represented by the presence and absence of pits at bit positions on a storage surface, the pits being formed in the storage surface by a probe mechanism of the device. Input data is coded to generate a coded bit sequence and an overwrite technique is employed to record the coded bit sequence on the storage surface over an old, previously-recorded bit sequence. Together with the properties of the coded bit sequence, the overwrite technique exploits the physical mechanism of the write process in that, with appropriate spacing of the bit positions on the storage surface, writing a pit at a bit position can erase an existing pit within a defined number of neighboring bit positions. In addition, the overwrite technique involves reading at least certain bits of the old bit sequence, whereby the pattern of data written on the storage surface in an overwrite operation is determined in part by the results of reading old data.

55 Claims, 9 Drawing Sheets

|  | write areas (wa = 1) | | | | | | | | | | | | | | spare bit |
|---|---|---|---|---|---|---|---|---|---|---|---|---|---|---|---|---|

| Bit Positions i: | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Old data $d_i$: | 1 | 0 | 1 | 0 | 0 | 1 | 0 | 0 | 0 | 1 | 0 | 1 | 0 | 0 | 1 | 0 |  |
| Coded data $b_i$: | 0 | 0 | 0 | 0 | 1 | 0 | 1 | 0 | 0 | 1 | 0 | 0 | 1 | 0 | 0 | 0 |  |
| reads: | R | - | - | - | - | R | - | R | R | - | R | R | - | R | R | - |  |
| writes: | - | W | W | W | W | - | W | - | - | W | - | - | W | - | - | W | W | write results

| i = 1: | 0 | 1 | 0 | 0 | 0 | 1 | 0 | 0 | 0 | 1 | 0 | 1 | 0 | 0 | 1 | 0 |
|---|---|---|---|---|---|---|---|---|---|---|---|---|---|---|---|---|
| i = 2: | 0 | 0 | 1 | 0 | 0 | 1 | 0 | 0 | 0 | 1 | 0 | 1 | 0 | 0 | 1 | 0 |
| i = 3: | 0 | 0 | 0 | 1 | 0 | 1 | 0 | 0 | 0 | 1 | 0 | 1 | 0 | 0 | 1 | 0 |
| i = 4: | 0 | 0 | 0 | 0 | 1 | 0 | 0 | 0 | 0 | 1 | 0 | 1 | 0 | 0 | 1 | 0 |
| i = 6: | 0 | 0 | 0 | 0 | 1 | 0 | 1 | 0 | 0 | 1 | 0 | 1 | 0 | 0 | 1 | 0 |
| i = 9: | 0 | 0 | 0 | 0 | 1 | 0 | 1 | 0 | 0 | 1 | 0 | 1 | 0 | 0 | 1 | 0 |
| i = 12: | 0 | 0 | 0 | 0 | 1 | 0 | 1 | 0 | 0 | 1 | 0 | 0 | 1 | 0 | 1 | 0 |
| i = 15: | 0 | 0 | 0 | 0 | 1 | 0 | 1 | 0 | 0 | 1 | 0 | 0 | 1 | 0 | 0 | 1 |
| i = 16: | 0 | 0 | 0 | 0 | 1 | 0 | 1 | 0 | 0 | 1 | 0 | 0 | 1 | 0 | 0 | 0 | 1 |

| Bit Positions i: | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Old data $d_i$: | 1 | 0 | 1 | 0 | 0 | 1 | 0 | 0 | 0 | 1 | 0 | 1 | 0 | 0 | 1 | 0 |  |
| Coded data $b_i$: | 0 | 0 | 0 | 0 | 1 | 0 | 1 | 0 | 0 | 1 | 0 | 0 | 1 | 0 | 0 | 0 |  |
| reads: | R | – | – | – | – | – | – | – | R | – | – | R | – | – | R | – |  |
| writes: | – | W | W | W | W | – | W | – | – | W | – | – | W | – | – | W | W | with write areas (wa = 1) and spare bit at position 15–16.

FIG. 4

| Bit Positions i: | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Old data $d_i$: | 1 | 0 | 1 | 0 | 0 | 1 | 0 | 0 | 0 | 1 | 0 | 1 | 0 | 0 | 1 | 0 |  |
| Coded data $b_i$: | 0 | 0 | 0 | 0 | 1 | 0 | 1 | 0 | 0 | 1 | 0 | 0 | 1 | 0 | 0 | 0 |  |
| reads: | R | – | – | – | – | – | – | – | – | – | – | – | – | – | R | – |  |
| writes: | – | W | W | W | W | – | W | – | – | W | – | – | W | – | – | W | W | with write areas (wa = 1) and spare bit at position 15–16.

FIG. 6

|  |  |  |  |  |  | write areas (wa = 1) |  |  |  |  |  |  |  |  |  | spare bit |
|---|---|---|---|---|---|---|---|---|---|---|---|---|---|---|---|---|
| Bit Positions i: | 0 | 1 | 2 | 3 | 4 | 5 | 6 | 7 | 8 | 9 | 10 | 11 | 12 | 13 | 14 | 15 | 16 |
| Old data $d_i$: | 1 | 0 | 0 | 1 | 0 | 0 | 0 | 0 | 1 | 0 | 0 | 0 | 1 | 0 | 0 | 1 |  |
| Coded data $b_i$: | 0 | 0 | 0 | 0 | 0 | 1 | 0 | 0 | 0 | 1 | 0 | 0 | 1 | 0 | 0 | 0 |  |
| reads: | R | – | – | – | – | – | R | R | R | – | R | R | – | R | R | R |  |
| writes: | – | W | – | W | – | W | – | – | – | W | – | – | W | – | – | – | W | write results

| i = 1: | 0 | 1 | 0 | 0 | 0 | 0 | 0 | 0 | 1 | 0 | 0 | 0 | 1 | 0 | 0 | 1 |  |
|---|---|---|---|---|---|---|---|---|---|---|---|---|---|---|---|---|---|
| i = 3: | 0 | 0 | 0 | 1 | 0 | 0 | 0 | 0 | 1 | 0 | 0 | 0 | 1 | 0 | 0 | 1 |  |
| i = 5: | 0 | 0 | 0 | 0 | 0 | 1 | 0 | 0 | 1 | 0 | 0 | 0 | 1 | 0 | 0 | 1 |  |
| i = 9: | 0 | 0 | 0 | 0 | 0 | 1 | 0 | 0 | 0 | 1 | 0 | 0 | 1 | 0 | 0 | 1 |  |
| i = 12: | 0 | 0 | 0 | 0 | 0 | 1 | 0 | 0 | 0 | 1 | 0 | 0 | 1 | 0 | 0 | 1 |  |
| i = 16: | 0 | 0 | 0 | 0 | 0 | 1 | 0 | 0 | 0 | 1 | 0 | 0 | 1 | 0 | 0 | 0 | 1 |

FIG. 8

|  |  |  |  |  |  | write areas (wa = 1) |  |  |  |  |  |  |  |  |  | spare bit |
|---|---|---|---|---|---|---|---|---|---|---|---|---|---|---|---|---|
| Bit Positions i: | 0 | 1 | 2 | 3 | 4 | 5 | 6 | 7 | 8 | 9 | 10 | 11 | 12 | 13 | 14 | 15 | 16 |
| Old data $d_i$: | 1 | 0 | 0 | 1 | 0 | 0 | 0 | 0 | 1 | 0 | 0 | 0 | 1 | 0 | 0 | 1 |  |
| Coded data $b_i$: | 0 | 0 | 0 | 0 | 0 | 1 | 0 | 0 | 0 | 1 | 0 | 0 | 1 | 0 | 0 | 0 |  |
| reads: | R | – | – | – | – | – | – | – | – | – | – | – | – | – | – | R |  |
| writes: | – | W | – | W | – | W | – | – | – | W | – | – | W | – | – | – | W |

FIG. 10

| Code: | (1, 3) | (2, 10) code 1 | (2, 10) code 2 |
|---|---|---|---|
| $N_w$ | 0.41 | 0.38 | 0.37 |
| $N_r$ | 0.22 | 0.42 | 0.41 |
| $N_{method2}$ | 0.44 | 0.61 | 0.57 |
| $N_{code}$ | 0.37 | 0.2 | 0.22 |

| Code: | (2, 10) code 1 | (2, 10) code 2 |
|---|---|---|
| $N_{w2}$ | 0.24 | 0.25 |
| $N_{r2}$ | 0.29 | 0.26 |
| $N_{method3}$ | 0.3 | 0.29 |
| $N_{code}$ | 0.2 | 0.22 |

DATA OVERWRITING IN PROBE-BASED DATA STORAGE DEVICES

BACKGROUND OF THE INVENTION

1. Technical Field

This disclosure relates generally to probe-based data storage devices, and more particularly to methods and apparatus enabling overwriting of data in such devices whereby data can be stored without first erasing previously-written data.

2. Discussion of the Related Art

In probe-based data storage devices, stored data is represented on a storage surface by the presence and absence of indentations, or "pits", which are formed in the surface by a probe of the device. For example, in AFM (Atomic Force Microscope)-based storage devices, the probe is a nanometer-sharp tip mounted on the end of a microfabricated cantilever. This tip can be moved over the surface of a storage medium in the form of a polymer substrate. A mechanism is provided for heating the tip, and thus the polymer surface at the point of contact with the tip, allowing the tip to penetrate the surface to create a pit. Such a pit typically represents a bit of value "1", a bit of value "0" being represented by the absence of a pit at a bit position on the storage surface. In a read-scan mode, the thermomechanical probe mechanism can be used to read-back data by detecting the deflection of the cantilever as the tip is moved over the pattern of bit indentations. AFM-based data storage is described in detail in IBM Journal of Research & Development, Volume 44, No. 3, May 2000, pp323-340, "The 'Millipede'—More Than One Thousand Tips for Future AFM Data Storage", Vettiger et al., and the references cited therein. As described in this document, while basic read/write operations can be implemented using a single cantilever probe, in practice an integrated array of individually-addressable cantilevers is employed in order to increase data rates. Each cantilever of the array can read and write data within its own storage field as the array is moved relative to the storage surface.

Overwriting of data in probe-based data storage devices is problematical. For example, if a zero corresponds to "no pit" at a bit position, writing a zero at a bit position corresponds to no action. Hence, "writing" a zero over a previously-written "1" at a bit position will leave the old "1" in tact, rendering the newly-written data incorrect. Prior systems have thus required old data to be erased before new data can be written on the storage surface. For example, in the Millipede device discussed above, old data can be erased by heating the storage surface to cause melting and "reflow" of the polymer. This requirement for erasing old data prior to writing has adverse implications for both power consumption and operating speed.

Systems which allow direct overwriting of old data with new data in probe-based data storage devices have been disclosed in our copending European Patent Application No. 02010648.0, filed 13 May 2002. Aspects of these systems were also discussed in "The Role of Signal Processing and Coding in Data Storage: State of the Art and Future Trends", E. Eleftheriou, IEEE Communications Theory Workshop 2002, Sanibeli Island, Fla., May 19-22, 2002. Overwriting is achieved in these systems by applying an input data coding process and exploiting the physical mechanism of the write process. In particular, when a pit is written on the storage surface, material is displaced by the probe and deposited in the surrounding area. In the Millipede device discussed above for example, melted polymer is deposited in the area around a pit creating "donut walls", or "rings", which have a higher topological profile than the polymer background. If a pit is formed sufficiently near to an existing pit, the existing pit can be at least partially filled due to the material deformation, effectively changing a "1" to a "0" and thus erasing the "1". This phenomenon therefore imposes a limit $T_{min}$ on the smallest distance between pits to be recorded on the storage surface. By employing an input data coding process, the systems disclosed in our European Application No. 02010648.0 exploit this phenomenon to achieve direct overwriting of data. The input data coding is effectively a two-stage process. In the first stage, input data is coded to prevent occurrence of two consecutive bits of a given value "x" in the coded input data. If x=1 for example, then the coding ensures that successive "1's" in the coded input data are separated by at least "d" zeros, where d is a predetermined number ≥1. The effect of this coding is to ensure that successive pits to be left in the storage surface after a write operation are always separated by at least one "no-pit". This coding therefore allows the recorded bit density to be increased over the uncoded case where the minimum bit spacing is constrained to $T_{min}$. In the second coding stage, an algorithm is employed to generate an overwrite bit sequence from the coded input bit sequence. In simple terms, the algorithms employed here are based on the premise that writing a pit can erase an existing, neighboring pit on either side of the new pit due to deformation of material as discussed above. When the resulting overwrite bit sequence is written on the storage surface, the effect is to record either the original coded input bit sequence, or the complement of this bit sequence, depending on particular operating parameters. This result is independent of the bit values of the old data which is overwritten, and hence erasing of old data is not required.

In a development of the above overwrite techniques, our copending European Patent Application No. 02405541.0, filed 27 Jun. 2002, discloses systems which enable overwriting to be achieved with reduced power consumption. These systems use an initial coding stage in which the number d is ≥2, and the higher recorded bit density permitted by this coding is then specifically exploited. Overwrite sequences are generated and written on the storage surface, with a bit spacing such that writing a pit at a bit position can erase an existing pit within d neighboring bit positions. The process for generating the overwrite sequences again ensures that the result of an overwrite operation is to record either the original coded input bit sequence, or its complement, regardless of the bit values of the data overwritten.

SUMMARY OF THE INVENTION

According to an embodiment of the present invention there is provided a method for overwriting data in a probe-based data storage device wherein data bits are represented by the presence and absence of pits, formed in a storage surface by a probe mechanism of the device, at bit positions on the surface, the bit positions being spaced such that writing a pit at a bit position can erase a previously-written pit within r neighboring bit positions where r is a predetermined number ≥1. The method comprises:

coding input data such that successive bits of a value x in the coded bit sequence are separated by at least d bits of value $\bar{x}$, where d is a predetermined number ≥r;

reading at least sufficient of an old bit sequence to be overwritten by the coded bit sequence to locate any excess pits, where an excess pit is a pit which is not within r bit positions of the position at which a coded bit of value x is to be recorded; and progressing through the series of bit positions in which the coded bit sequence is to be recorded, writing new pits at sufficient positions that (a) any excess pit in the old bit sequence is erased by writing a new pit, (b) a pit remains at each position at which a coded bit of value x is to be recorded, and (c) any new pit written at a position in said series other than a position at which a coded bit of value x is to be recorded is erased by writing another new pit.

In alternate embodiments of the present invention, therefore, input data to be stored in the device is first coded to ensure that, in the resulting coded bit sequence, successive bits of a particular value x (which may be 0 or 1 in different embodiments) are separated by at least d bits of the complementary value $\bar{x}$ (where the symbol here and throughout signifies bit inversion). The predetermined number d in this coding process is dependent on the bit spacing employed in write operations. Specifically, if the spacing of bit positions is such that writing a pit at a bit position can erase a previously-written pit within r neighboring bit positions due to deformation of material, then r is $\geq 1$ and d is $\geq r$. After this initial coding stage, the coded bit sequence is recorded on the storage surface by an overwrite process. However, in contrast to our earlier systems which rely on overwrite processes which are independent of the old data to be overwritten, methods according to embodiments of the present invention make use of the old data in the overwrite process. The pattern of data written on the storage surface in an overwrite operation is thus determined in part by the results of reading old data. Not all of the old data need necessarily be read. It suffices that enough of the old data is read to locate any "excess pits" as defined above. These are the pits which must be erased by writing an appropriate pattern of new pits in the overwrite operation as will be explained in detail below. In general, when progressing through the series of bit positions for the overwrite operation, new pits are written at selected positions such that conditions (a) to (c) above are satisfied.

The above process of reading old data, and writing new pits in accordance with the specified conditions, ensures that the result of an overwrite operation is to record the coded bit sequence on the storage surface. In particular, a pit in the recorded pattern corresponds to a bit of value x in the coded bit sequence, and a "no-pit" in the recorded pattern corresponds to a bit of value x. Direct overwriting is thus achieved, and the need to erase old data prior to writing is eliminated. In addition, the reading of old data in the overwrite process enables identification of areas where special overwrite patterns must be employed to erase old data. Such overwrite patterns can thus be employed only where necessary. Moreover, at least in preferred embodiments of the invention, even less power is required for overwrite operations than for equivalent operations with prior overwrite systems. These power advantages will be discussed further below.

In general in the reading process, an excess pit may be positively located by reading a bit position and identifying a pit, or an excess pit may be located by identifying particular sets of bit positions (referred to herein as "write areas") which may contain excess pits. Thus, in some embodiments the process of locating excess pits may involve:

(1) reading at least sufficient of the old bit sequence to identify any excess pits which are not located in a set of bit positions immediately following another excess pit and ending with the first occurring of the next position at which a bit of coded value x is to be recorded and the bit position after the last position in said series; and (2) for each excess pit so identified, defining a write area as said set of bit positions immediately following that pit.

These two steps serve to locate all excess pits. Those excess pits which immediately precede a write area are positively identified by reading. Any additional excess pits must lie within a write area. Thus, identifying the write areas serves to locate any additional excess pits to within the extent of a write area. When progressing through the series of bit positions, it can then be determined whether a new pit needs to be written at a given position based on whether or not that position is in a write area. The particular requirements for the write operation here will be detailed below.

In probe-based devices such as the Millipede device discussed above, a bit sequence is written at a series of bit positions by moving a single read/write probe sequentially through the bit positions. Thus, while alternative embodiments might be envisaged, it will generally be desirable for a given bit position to be read, if required, when the probe reaches that position in its progression through the series of bit positions during the overwrite operation. That is, at each bit position in the series, it is determined whether that bit position should be read and/or whether a new pit needs to be written, the appropriate action is taken, and the probe then moves on to the next bit position. This can be achieved by embodiments in which, when progressing through the series of bit positions, the current bit position is read at least if three conditions are satisfied, namely:

(a) a coded bit of value x is to be recorded at the current position; and (b) the current position is not within r bit positions of the position at which a coded bit of value x is to be recorded, and not within d bit positions of a pit identified by reading a previous position; and (c) a write area indicator, indicating when set that the current position is in a write area, is unset.

In such embodiments, if a pit is identified by reading the current position, the write area indicator is set for the next bit position. This indicator then remains set until it is unset for a later bit position. Specifically, whenever a new pit is written in the last position of a write area, the write area indicator is unset for the next bit position. These features allow read decisions to be made, excess bits to be located and write areas defined, all as the write operation progresses. Particular embodiments using these features, and examples of how the write pattern is constructed, are detailed below.

While in general any coding scheme imposing a $d \geq r$ constraint can be employed for the initial coding of the input data, preferred embodiments of the invention utilize codes based on principles of RLL (Run-Length Limited) (d, k) constraint codes. Conventionally in such codes, the (d, k) constraint signifies that successive 1's in the coded bit sequence are separated by at least "d" zeros and at most "k" zeros, where k>d. As explained above however, in general the initial input data coding may prohibit two consecutive "1's" (x=1) or two consecutive "0's" (x=0) in the coded input data. Thus, while "d" and "k" conventionally represent numbers of zeros, in some embodiments these constraints may apply to the numbers of "1's" allowed between zeros.

Another embodiment of the invention provides apparatus for controlling overwriting of data in a probe-based data storage device wherein data bits are represented by the presence and absence of pits, formed in a storage surface by a probe mechanism of the device, at bit positions on the surface, the bit positions being spaced such that writing a pit at a bit position can erase a previously-written pit within r neighboring bit positions where r is a predetermined number ≥1. The apparatus comprises:

a coder for coding input data to be stored in the device such that successive bits of a value x in the coded bit sequence are separated by at least d bits of value $\bar{x}$, where d is a predetermined number ≥r; and a read/write controller for controlling reading and writing of data by the probe mechanism, the read/write controller being arranged to effect reading of at least sufficient of an old bit sequence to be overwritten by the coded bit sequence to locate any excess pits, where an excess pit is a pit which is not within r bit positions of the position at which a coded bit of value x is to be recorded, and, progressing through the series of bit positions in which the coded bit sequence is to be recorded, to effect writing of new pits at sufficient positions that (a) any excess pit in the old bit sequence is erased by writing a new pit, (b) a pit remains at each position at which a coded bit of value x is to be recorded, and (c) any new pit written at a position in said series other than a position at which a coded bit of value x is to be recorded is erased by writing another new pit.

Another embodiment of the invention provides probe-based data storage apparatus comprising:

a storage surface;

a probe mechanism for recording data on the storage surface by forming pits therein such that data is represented by the presence and absence of pits at bit positions on the surface, the bit positions being spaced such that writing a pit at a bit position can erase a previously-written pit within r neighboring bit positions where r is a predetermined number ≥1, and for reading data from the storage surface;

a coder for coding input data to be stored by the apparatus such that successive bits of a value x in the coded bit sequence are separated by at least d bits of value $\bar{x}$, where d is a predetermined number ≥r; and a read/write controller for controlling reading and writing of data by the probe mechanism, the read/write controller being arranged to effect reading of at least sufficient of an old bit sequence to be overwritten by the coded bit sequence to locate any excess pits, where an excess pit is a pit which is not within r bit positions of the position at which a coded bit of value x is to be recorded, and, progressing through the series of bit positions in which the coded bit sequence is to be recorded, to effect writing of new pits at sufficient positions that (a) any excess pit in the old bit sequence is erased by writing a new pit, (b) a pit remains at each position at which a coded bit of value x is to be recorded, and (c) any new pit written at a position in said series other than a position at which a coded bit of value x is to be recorded is erased by writing another new pit.

Another embodiment of the invention provides a program storage device readable by a machine, tangibly embodying a program of instructions executable by the machine to perform method steps for overwriting data in a storage device, wherein data bits are represented by at least one of a presence and an absence of pits formed at a plurality of bit positions on a storage surface, the plurality of bit positions being spaced such that writing a pit at each bit position can cause a previously-written pit within r bit positions to be erased, where r is a predetermined number ≥1, the method steps including coding data such that successive bits of a value x in a coded bit sequence are separated by at least d bits of value $\bar{x}$, where d is a predetermined number ≥r; reading an amount of an old bit sequence to be overwritten by the coded bit sequence sufficient to locate at least one excess pit, wherein each excess pit is a pit not within r bit positions of a bit position where a coded bit of the value x is to be recorded; writing, at respective bit positions, each pit required to erase each excess pit in the old bit sequence; and writing, at respective bit positions, each pit required to maintain a pit at each bit position where the coded bit of the value x is to be recorded.

Another embodiment of the present invention provides a system for controlling overwriting of data in a data storage device wherein data bits are represented by at least one of a presence and an absence of pits formed at a plurality of bit positions on a storage surface, the plurality of bit positions being spaced such that writing a pit at each bit position can cause a previously-written pit within r bit positions to be erased, where r is a predetermined number ≥1, the system including a coder for coding data to be stored in the data storage device such that successive bits of a value x in a coded bit sequence are separated by at least d bits of value $\bar{x}$, where d is a predetermined number ≥r; and a controller for controlling reading and writing of the data, wherein the controller effects reading of an amount of an old bit sequence to be overwritten by the coded bit sequence sufficient to locate at least one excess pit, wherein each excess pit is a pit not within r bit positions of a bit position where a coded bit of the value x is to be recorded; the controller effects writing, at respective bit positions, of each pit required to erase each excess pit in the old bit sequence; the controller effects writing, at respective bit positions, of each pit required to maintain a pit at each bit position where the coded bit of the value x is to be recorded; and the controller effects writing, at respective bit positions, of each pit required to erase each pit written at a bit position where the coded bit of the value x is not to be recorded.

It is to be understood that where embodiments are described herein with reference to a method, corresponding embodiments may be provided in an apparatus, a system and/or a program storage device readable by a machine, tangibly embodying a program of instructions executable by the machine to perform the method steps, and vice versa.

BRIEF DESCRIPTION OF THE DRAWINGS

Embodiments of the invention will now be described, by way of example, with reference to the accompanying drawings in which:

FIG. 4 illustrates the read/write operation with a modification to the FIG. 2 method;

FIG. 6 illustrates the read/write operation with an additional modification to the FIG. 2 method;

FIG. 8 illustrates the read/write operation in application of the FIG. 7 method to sample data;

FIG. 10 illustrates the read/write operation of FIG. 8 with additional modifications to the FIG. 7 method;

DETAILED DESCRIPTION OF THE PREFERRED EMBODIMENTS

Figures 1, 3:
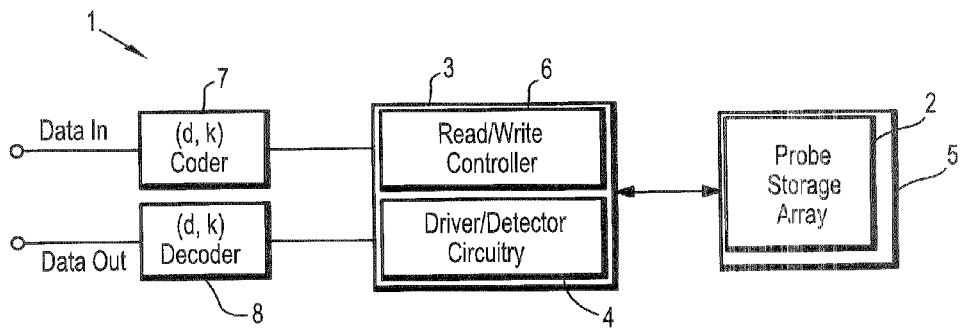
FIG. 1 is a schematic block diagram of a probe-based data storage device according to an embodiment of the present invention.
FIG. 3 illustrates the read/write operation in application of the FIG. 2 method to sample data.

FIG. 1 shows a probe-based storage device 1 according to an embodiment of the present invention. The device 1 includes a probe mechanism which, in this embodiment, comprises, for example, a Millipede probe-storage array 2 of the type described in the IBM Journal of Research & Development reference above. An array controller 3 controls operation of the probe array 2. Array controller 3 includes array driver & detector circuitry 4 as described in the aforementioned reference to drive the individual probes of the array to read and write data on the surface of a polymer storage medium 5. Array controller 3 also includes a read/write controller 6 for controlling operation of array 2 via driver/detector circuitry 4 so as to effect reading and writing of data in accordance with an overwrite method described hereinafter. In general, read/write controller 6 may be implemented in hardware or software or a combination thereof, and suitable implementations will be apparent to those skilled in the art from the description herein. The device 1 also includes a (d, k) coder 7 for coding input data to be stored by the device, and a (d, k) decoder 8 for decoding data read from the storage surface 5 to provide the data output. The coder 7 and decoder 8 can be implemented in generally known manner.

In operation, input data is supplied to (d, k) coder 7 which codes the input data as discussed further below to generate a coded bit sequence $b_0, b_1, b_2, \ldots$, etc. This coded bit sequence is supplied to array controller 3, whereupon read/write controller 6 implements an overwrite scheme described below to record the bits $b_0, b_1, b_2, \ldots$, at successive bit positions on storage surface 5. When recorded data is subsequently read from the storage surface, the read bit sequence is supplied by array controller 3 to (d, k) decoder 8. This decoder implements the inverse of the (d, k) code used by coder 7 whereby the original input data is recovered as output data.

The (d, k) code implemented by coder 7 ensures that successive bits of a particular value x in the coded input data are separated by at least d and at most k bits of value $\bar{x}$, where d is a predetermined number $\geq 1$ and k>d. In the following examples, it is assumed that x=1 in the (d, k) coding process so that successive "1's" in the coded bit sequence $b_0, b_1, b_2, \ldots$, are separated by at least d and at most k zeros. In this case, when the coded bit sequence is recorded on storage surface 5, a recorded bit of value "1" is represented by a pit on the storage surface and a bit of value zero corresponds to "no-pit". The d-constraint in the input data coding therefore ensures that successive pits to be recorded on the storage surface will always be separated by at least d "no-pits". This allows the recorded bit density to be increased over the uncoded case (d=0) where the minimum bit spacing is constrained to $T_{min}$ as explained earlier. For operation of overwrite methods according to embodiments of the present invention, the spacing of bit positions on storage surface 5 is such that writing a pit a bit position can erase a previously-written pit within r neighboring bit positions, where r is a predetermined number $\geq 1$. For any given value of r, the value of d in the input data coding process is constrained to d$\geq$r. With these constraints, if a new pit is written at a bit position i containing no pit, then any existing pit in bit positions i−r to i+r will be erased. The d-constraint ensures that no more than one pit can exist from position i−r to position i and from position i to position i+r. Thus, a maximum of two neighboring pits are erased by writing a new pit, one on each side of the write position i. In addition, if a new pit is written at a bit position i containing an existing pit, then the neighboring bit positions in the range i−r to i+r necessarily contain "no-pits" due to the d-constraint. Examples of various overwrite schemes which can be implemented by read/write controller 6, and which make use of these effects, will now be described.

In the following examples, $b_0, b_1, b_2, \ldots, b_i, \ldots, b_{n-1}$ is the coded bit sequence output by (d, k) coder 7 to be recorded at bit positions i=0, 1, 2, . . . n−1, and $d_0, d_1, d_2, \ldots, d_i, \ldots, d_{n-1}$ is the old bit sequence to be overwritten in the recording process. A spare bit is used at bit position n as explained below.

In the first overwrite method to be described, d=1 in the initial input data coding process, and r=1 in the write process so that writing a new pit at a bit position i can erase an existing pit in neighboring positions i−1 and i+1. For any single-bit write operation, the old and new bit sequences can differ in the following cases:

(1) old bit $d_i$=1, new bit $b_i$=0

(2) old bit $d_i$=0, new bit $b_i$=1

In case (1), the old "1" is erased (i.e. changed to a "0") by writing a "1" (i.e. a new pit) at the next bit position. Because of the d-constraint, the old "1" is always followed by at least one "0", and this is changed to a "1" by writing the new pit. This procedure is therefore executed repeatedly until the next "1" in the $b_i$-sequence. In case (2), the old "0" is changed to a "1" by writing a "1" in its position. No further action is required here since a "1" in the $b_i$-sequence is always followed by at least one "0" due to the d-constraint. Hence, even if the next bit of the old bit sequence was a "1", it will have been erased by writing the new pit and thus provides the "0" required at this position in the $b_i$-sequence. Based on these principles, the overwrite method exploits the relative positions of the "1's" in the old and new bit sequences by defining "write areas". Progressing through the series of bit positions i, certain old bits $d_i$ are read as described below. If a "1" is read at a given position j and the next "1" in the $b_i$-sequence is at a position m, then the write area consists of the set of (m−j) bits at positions (j+1) to m. A variable wa is defined as the write area indicator. The write area indicator wa is set (wa=1) for all bit positions in a write area, otherwise it is unset (wa=0). The read/write process effected by read/write controller 6 in this example is described by the following pseudo-code and represented in the flow chart of FIG. 2:

Initialization:

```
i = 0, wa = 0
if b_0 = 1
    write '1' at bit position i = 0
else
    read d_0, and if d_0 = 1, then  wa = 1
Loop for 1 ≤ i ≤ n − 1:
    if b_i = 1
        write '1' at bit position i,  wa = 0
    else if wa = 1
        write '1' at bit position i
    else
        read d_i, and if d_i = 1, then  wa = 1
    i = i + 1
Spare bit (i = n):
    if wa = 1
        write '1' at bit position n
```

Figure 2:
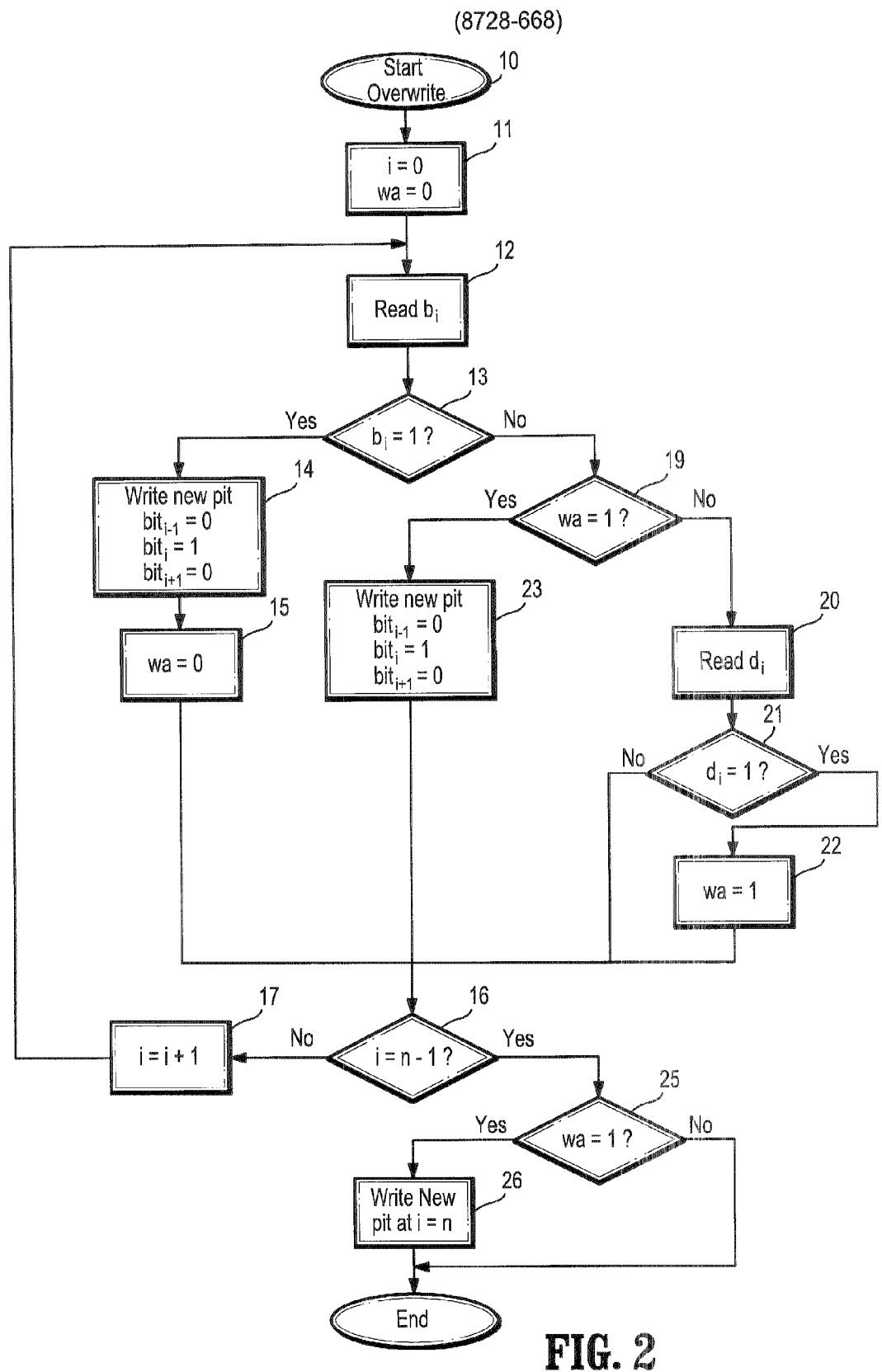
FIG. 2 is a flow chart illustrating a first overwrite method according to an embodiment of the present invention.

Referring to FIG. 2, when an overwrite operation commences as indicated at step 10, the variables i and wa are initialized to zero in step 11. Controller 6 then reads the first bit $b_i$ of the coded bit sequence in step 12. If $b_i=1$ ("Yes" at step 13), then operation proceeds to step 14 where a "1" is written as a new pit at the current bit position i. Due to effects described above, in general writing this "1" ensures that the bits stored at positions (i−1), i and (i+1) are now 0, 1, 0 respectively as indicated in block 14, though for i=0 only positions i and (i+1) are of course relevant. The variable wa is then set to zero in step 15, thereby unsetting the write area indicator if this had previously been set (wa=1) as may be the case in a later pass of the process. Operation then proceeds to step 16 where controller 6 checks whether the last position (n−1) of the bit position series for recording the $b_i$-sequence has been reached. If not, ("No" at step 16), the current bit position i is incremented in step 17 and operation reverts to step 12 for the next bit position.

If, in any pass of step 13, $b_i=0$ for current bit position, then at step 19 controller 6 checks whether the write area indicator wa is set. If not, i.e. the current bit position is not in a write area, then the old bit $d_i$ at the current bit position is read in step 20. If there is an existing pit at the current bit position, i.e. $d_i=1$ in decision step 21, then the write area indicator is set in step 22 and operation proceeds to step 16. Assuming i<n−1 here, operation proceeds to the next bit position and reverts to step 12 as before. Returning to step 21, if $d_i=0$ here then the write area indicator remains unset and operation proceeds directly to step 16. Thus, if $d_i=0$ when a current bit position is read, no action is required. However, if a pit is identified ($d_i=1$) when a current bit position is read, then the write area indicator is set for the next bit position.

Returning now to step 19, if the write area indicator is determined to be set here for the current bit position, then operation proceeds to step 23 where a "1" is written as a new pit at the current position. Operation then proceeds to step 16 and continues as before. When the last bit position in the series is eventually reached, i.e. i=n−1 at step 16, then in step 25 controller 6 checks whether the write area indicator wa is currently set. If not, no action is required and the overwrite process is complete. If wa=1, however, then at step 26 controller 6 writes a "1" as a new pit at the "spare" bit position n, and the process is complete.

FIG. 3 demonstrates operation of the above overwrite process by way of a worked example for sample data. This simplistic example assumes that a 16-bit coded $b_i$-sequence is to be recorded at bit positions i=0 to 15, with i=16 providing the spare bit position. The old bit sequence $d_i$ to be overwritten, and the coded $b_i$-sequence, are shown at the top of the figure. As the overwrite operation progresses, the write area indicator wa is set and unset as described above, whereby write areas are defined as indicated in the figure. As the probe progresses through the series of bit positions, reading (R) or writing of a new pit (W) is performed at selected bit positions as indicated below the data lines in the figure. The results of successive writes W as the overwrite operation progresses are shown by the nine bit patterns at the bottom of the figure. Each of these patterns shows the bit sequence remaining on the storage surface when a particular write operation W has been performed. Thus, the first pattern shows the recorded sequence after the new pit has been written at i=1, the second shows the sequence after the write at i=2, and so on. In each pattern, the "1" shown in bold marks the position of the new pit just written. It can be seen from this figure that, once the last new pit has been written at the spare bit position i=16, the bit sequence recorded at the series of bit positions i=0 to 15 is the original coded $b_i$-sequence.

While the simple example above demonstrates operation of the overwrite method, in practice a line of data for a write operation will typically be much longer than 16 bits. With regard to the spare bit position, guard bands can be provided around writable sectors on the storage medium to ensure there is space at the beginning and end of a row and avoid interference between data in different sectors. When data is read-back from the storage surface, extra bits in guard bands are ignored. Note that it is not necessary to write a new pit in the spare bit position in all cases, but only when this position falls in a write area. Consideration of FIG. 3 shows that, whenever an "old" pit (i.e. $d_i=1$) is identified by reading a bit position i, a write area then follows. (Note that by the time position i=5 is read, the original "1" here has been erased by the write W at i=4). In particular, a write area is defined as the set of bit positions which immediately follows an "old" pit identified by reading a bit position, and which ends with the first occurring of (a) the next position at which a coded bit $b_i$ of value "1" is to be recorded, and (b) the bit position after the last bit position in the series i=0 to n−1 (i.e. the spare bit position). It can also be seen that, with this method, the conditions for reading (R) or writing a new pit (W) at a given bit position are as follows:

for each position in the series i=0 to n−1, the current position is read if both (a) a coded bit $b_i$ of value "0" is to be recorded at the current position, and (b) the write area indicator is unset;

for each position i=0 to n, a new pit is written at the current position if either (a) a coded bit $b_i$ of value "1" is to be recorded at the current position, or (b) the write area indicator is set.

In a first modification to the above embodiment, the number of read operations R can be reduced by taking into account the effect of the r=1 constraint in the bit spacing. In particular, if a new pit is written (W) at a current bit position, then the next bit position need not be read since it must contain a "0", any "1" existing previously at this position having been erased by the write operation W. Since bit positions in a write area are not read in any case, the read-saving applies to positions outside write areas. FIG. 4 shows the read/write process for the same data as FIG. 3 but including this modification in the overwrite method. As illustrated, the reads R at bit positions i=5, 7, 10 and 13 are omitted. It can be seen that each of these positions is the bit position after a position at which a coded bit $b_i$ of value "1" is to be recorded. By the time any one of these positions is reached in the progression through the bit series, the position necessarily contains a "0" due to the effect just mentioned, so the result of the overwrite operation is unchanged.

Figure 5:
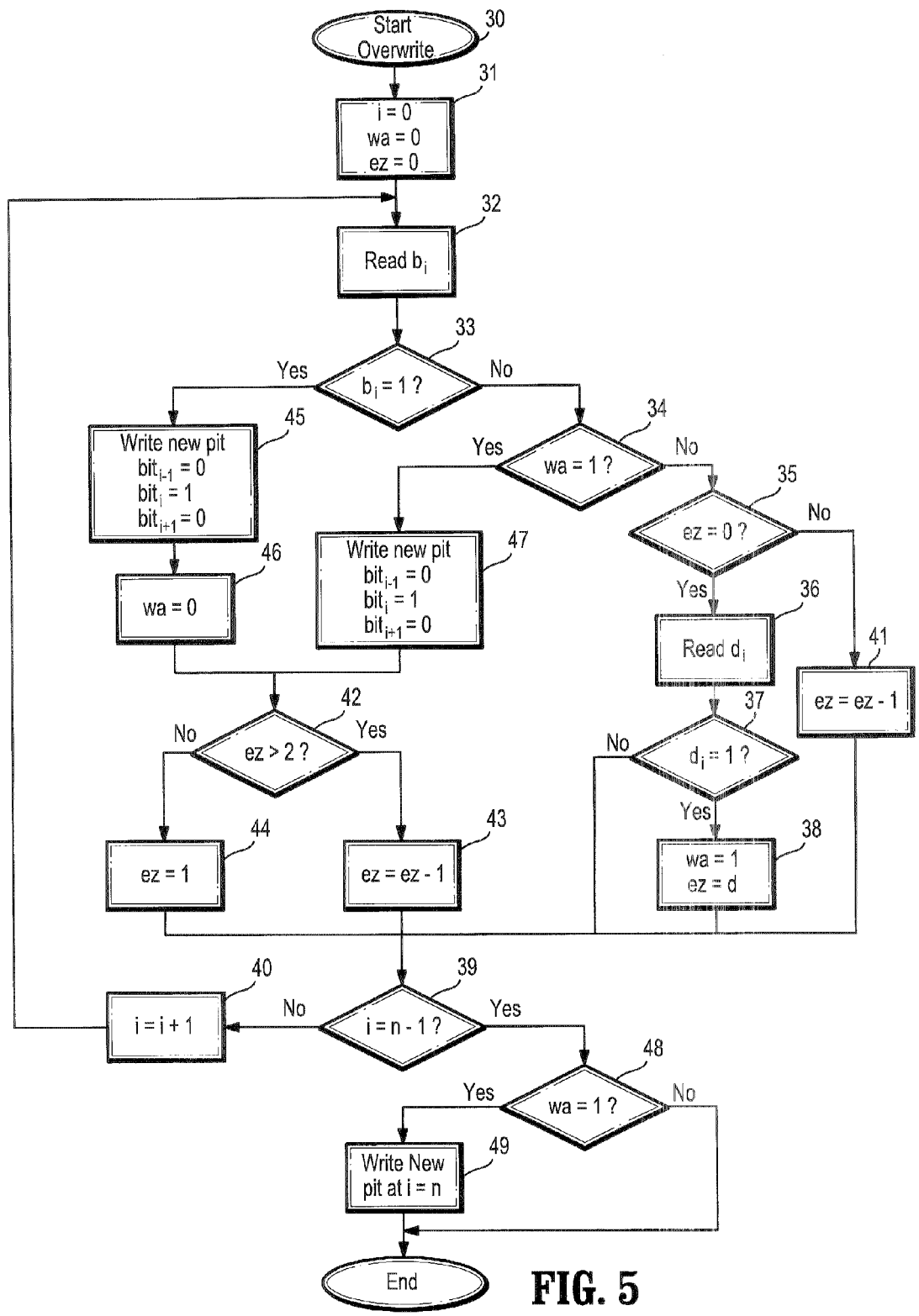
FIG. 5 is a flow chart illustrating a second overwrite method according to an embodiment of the present invention.

A second modification to the FIG. 2 embodiment takes advantage of the d-constraint to reduce the number of reads R. In particular, if an old pit ($d_i$=1) is identified by reading a current bit position, then the next d bit positions need not be read since they necessarily contain "0's" due to the d-constraint. FIG. 3 shows that, in the first embodiment, the old pits which are identified by reading are those which immediately precede a write area. Since bit positions in a write area are not read here, the read-saving only applies in this particular embodiment where d is greater than the write area length. The minimum write area length is one bit, so that a read-saving is possible here where d>1. While this read-saving only occurs where d is greater than the length of a given write area in operation, statistical analysis using various (d, k) codes shows that shorter write area lengths are more probable, with single-bit write areas being by far the most probable. Where this read-saving is applied in addition to that based on the r=1 constraint described with reference to FIG. 4, then an additional saving is possible where d>2. The flow chart of FIG. 5 illustrates a second overwrite according to an embodiment of the present invention, where both of these read-saving measures are applied with r=1 and a general value of d>2. In this embodiment, an additional variable ez is employed to define the length of an "exclusion zone". An exclusion zone is a set of bit positions in which reads R need not be performed due to one or other of the read-saving measures just described.

Referring to FIG. 5, the overwrite method corresponds broadly to that of FIG. 2 and only the key differences will be described here. Thus, steps 30 to 33 correspond to steps 10 to 13 respectively of FIG. 2, but the additional variable ez is initialized to zero in step 31. In step 33, assuming the current coded bit $b_i$=0, then in step 34 controller 6 checks whether the write area indicator is set. Assuming not, then step 35 checks whether ez=0. Assuming so (i.e. the current bit position is not in a write area or an exclusion zone), then the old bit $d_i$ at the current position is read in step 36. Next, assuming $d_i$=1 in decision step 37, then in step 38 the write area indicator is set and the variable ez is set to d. Thus, the next bit position is the first position of a write area and also an exclusion zone of length d. Operation then proceeds to step 39 which corresponds to step 16 of FIG. 2. Returning to step 37, if $d_i$=0 here then no action is required and operation would proceed directly to step 39.

Supposing that $b_i$=0 in the next pass of step 33, then since the write area indicator is now set (wa=1), operation will proceed from step 34 to step 47. A new pit is then written at the current bit position as in step 23 of FIG. 2. After this, however, the controller checks in step 42 whether ez>2. This is to determine whether the current exclusion zone extends beyond the next bit position. If so, in step 43 the value of ez is reduced by one (to account for the current bit position), and operation proceeds to step 39. Returning to step 42, if ez Ÿ 2 here then ez is set to 1 in step 44 since a new pit has just been written at the current position so a read-exclusion always applies at the next bit position due to the r-constraint.

Supposing $b_i$=1 in the next pass of step 33, signifying the last bit position of a write area, then operation proceeds to step 45 where the $b_i$=1 is written as a new pit at the current position. In step 46, the write area indicator is then unset ready for the next bit position, and operation continues via step 42 as just described. In the next pass of step 33, $b_i$=0 and wa=0 at step 34. Since ez is still ≥1 in this scenario, the step 36 read is omitted at the current position and, in step 41, the value of ez is reduced by one ready for the next bit position. This read at the first position following a write area can always be omitted due to the r-constraint. However, if ez is still ≥1 after step 41 due to the d-constraint, at the next bit position the coded bit will be $b_i$=0 again, and a further read-saving will occur at step 35 for this bit position. This read saving will continue for subsequent bit positions until ez is reduced to zero.

Note that, for a $b_i$=1 outside a write area, a new pit will be written in step 45 at the current position. Step 46 has no effect here since the write area indicator is already unset, and ez will be zero in step 42. Thus, ez will be set to "1" in step 44 to provide a 1-bit exclusion zone at the next bit position, this position necessarily containing a "0" due to the r-constraint. When the last position i=n−1 of the series is eventually reached in step 39, operation proceeds as in the FIG. 2 embodiment, steps 48 and 49 of the current method corresponding to steps 25 and 26 of FIG. 2.

Consideration of the FIG. 5 embodiment shows that, in this overwrite method, the condition for reading a current bit position in the series is that:

(a) a coded bit of value "0" is to be recorded at the current position; and (b) the current position is not the position after the position at which a coded bit of value "1" is to be recorded, and not within d bit positions of a pit identified by reading a previous position; and (c) the write area indicator is unset.

The embodiments of FIGS. 2 and 5 provide simple and efficient overwrite systems. However, in a further modification to embodiments described, a further read-saving can be made by exploiting the effect of the r-constraint on the bit position preceding a write operation W. In particular, if a new pit is to be written (W) at a given bit position, then the previous bit position i−1 need not be read since it will always contain a "0" after the write W at position i. Since bit positions in a write area are not read in the above embodiments, the additional read-saving applies to positions outside write areas. FIG. 6 shows the read/write process for the same data as FIGS. 3 and 4, but including this modification in addition to that demonstrated in FIG. 4. Compared to FIG. 4, the reads R at bit positions i=8 and 11 are omitted. It can be seen that each of these positions is the bit position preceding a position at which a coded bit $b_i$ of value "1" is to be recorded. The omission of the read at i=11 prevents a write area being defined for position i=12. However, the final result of the overwrite operation is unchanged.

Consideration of FIG. 6 shows that the key requirement of the reading process in the overwrite operation is to locate those pits (here "1's") in the old data sequence which are not within r bit positions of a position at which a coded bit $b_i$ of value "1" is to be recorded, where r=1 in this example. These pits are the "excess pits" as defined herein. In the sample data shown, the excess pits are those at bit positions i=0, 2 and 14. It is these excess pits which must be specifically erased by writing an appropriate pattern of new pits in the overwrite operation, over and above the new pits written at positions where $b_i$=1. In the FIG. 6 process, the excess pits are located by a combination of reading bit positions and defining write areas. Specifically, the excess pits at i=0 and i 14 are identified by reading these bit positions. These are the excess pits which are not located within a set of bit positions immediately following another excess pit and ending with the first occurring of (a) the next position at which a coded bit $b_i$ of value "1" is to be recorded and (b) the spare bit position. A write area is then defined following each of these excess pits as the aforementioned set of bit positions. Any additional excess pits must then lie within a write area, and are thus located via definition of the write areas. In FIG. 6, for instance, the excess pit at i=2 is located within the write area following the excess pit read at i=0. The write areas then demarcate those areas where special write patterns must be employed in order to erase the excess pits. In the embodiments described thus far where r=1, the write pattern employed is a sequence of successive pits.

A third overwrite method will now be described in which d=2 in the initial input data coding process and r=2 in the write process. Here, the r-constraint implies that writing a new pit at a bit position i can erase an existing pit in neighboring positions i−2, i−1, i+1 and i+2, with the d-constraint ensuring that a maximum of two pits occur in these positions, one on each side of the write position i. If an old pit already exists at position i, then the d-constraint ensures that the neighboring positions in the range i−2 to i+2 necessarily contain "no-pits". As before, for any single-bit write operation in this embodiment, the old and new bit sequences can differ in the following cases:

(1) old bit $d_i=1$, new bit $b_i=0$
(2) old bit $d_i=0$, new bit $b_i=1$

In case (1), the old "1" at a position i is erased by writing a "1" (i.e. a new pit) in either of positions i+1 and i+2. Because of the d-constraint, the old "1" is always followed by at least two "0's", one of which is changed to a "1" by writing the new pit. This procedure is therefore executed repeatedly until the next "1" in the $b_i$-sequence. The particular write-patterns that can be used here are described below. In case (2), the old "0" is changed to a "1" by writing a "1" in its position. No further action is required here since a "1" in the $b_i$-sequence is always followed by at least two "0's" due to the d-constraint. Hence, even if either of the next two bits of the old bit sequence was a "1", this will have been erased by writing the new pit, thus providing the "0's" required at these positions in the $b_i$-sequence. Based on these principles, the overwrite method again exploits the relative positions of the "1's" in the old and new bit sequences. As before, when progressing through the series of bit positions i, certain old bits $d_i$ are read (R), write areas are defined by setting and unsetting a write area indicator wa, and new pits are written (W) at certain bit positions. However, an additional variable Lwa is used in this method to track the length of a write area during the overwrite operation. The read/write process effected by read/write controller 6 in this embodiment is described by the following pseudo-code:

Initialization:

```
i = 0, wa = 0, Lwa = 0
if b_0 = 1
    write '1' at bit position i = 0
else if b_1 = 1
    write '1' at bit position i = 1
else
    read d_0, and if d_0 = 1, then wa = 1 and Lwa = 2
        else if d_1 = 1, then wa = 1 and Lwa = 1
Loop for 2 ≤ i ≤ n − 1:
    if b_i = 1
        if Lwa is even, then write "1's" at positions i − Lwa + [2:2:Lwa]
        else write "1's" at positions i − Lwa + [1:2:Lwa]
        wa = 0, Lwa = 0
    else if wa = 1
        Lwa = Lwa + 1
    else
        read d_i, and if d_i = 1, then wa = 1 and Lwa = 1
    i = i + 1
Spare bit (i = n):
```

```
if wa = 1
    if Lwa is even, then write "1's" at
    positions n − Lwa + [2:2:Lwa]
    else write "1's" at positions n − Lwa + [1:2:Lwa]
```

Figure 7:
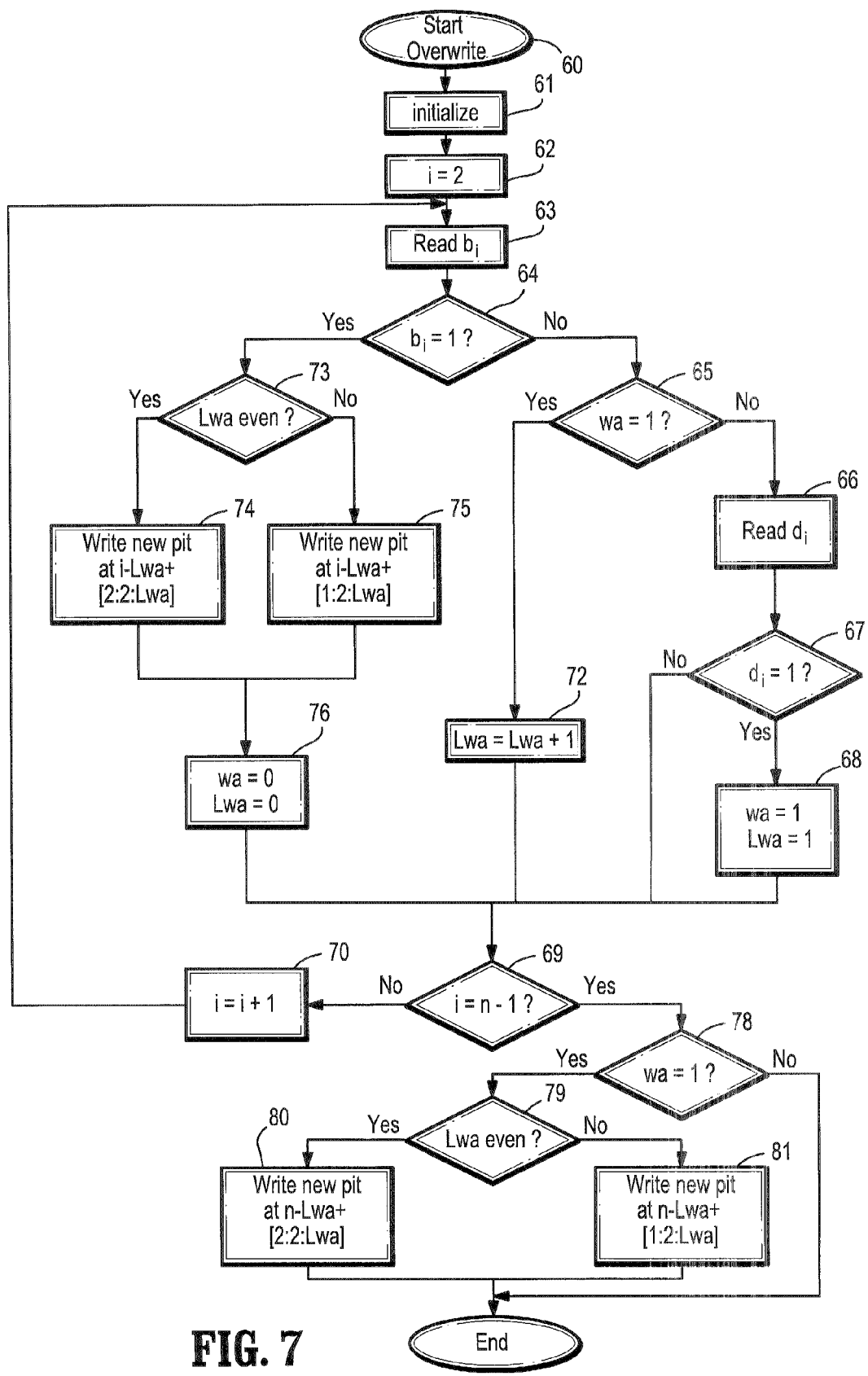
FIG. 7 is a flow chart illustrating a third overwrite method according to an embodiment of the present invention.

The read/write process defined by the above algorithm is represented in the flow chart of FIG. 7 where an overwrite operation commences at step 60. The initialization process in the above algorithm is represented by step 61 here for simplicity. This initialization process deals with the first two coded bits $b_0$ and $b_1$ as defined above, and the effect of this process will be apparent from the following explanation of how write areas are used in the overall operation. Thus, in step 62 of FIG. 7, i is set to 2 for the next bit position, and the current bit (initially $b_2$) of the coded bit sequence is read in step 63. If $b_i=0$ at decision step 64, then operation proceeds to step 65 which determines whether the current bit position is in a write area (wa=1). If not, then the old bit $d_i$ at the current bit position is read in step 66. If there is an existing pit at the current bit position, i.e. $d_i=1$ in decision step 67, then in step 68 the write area indicator is set (wa=1) ready for the next bit position, and the write area length indicator Lwa is also set to 1. Lwa=1 indicates that the next bit position is the first bit position of a write area. Operation then proceeds to step 69 which checks whether the last coded bit $b_{n-1}$ has been reached. Assuming not, operation proceeds to the next bit position in step 70 and reverts to step 63 for this position. Returning to step 67, if $d_i=0$ here then no action is required and operation proceeds directly to step 69.

Returning now to step 65, if the write area indicator is determined to be set here for the current bit position, then in step 72 the length indicator Lwa is incremented by one. Thus for successive bit positions in a write area, the indicator Lwa is successively incremented to track the length of the current write area. When a $b_i=1$ is subsequently read at step 64, then operation proceeds to step 73 which checks whether the current value of Lwa is even. If so, in step 74 controller 6 writes "1's" as new pits at bit positions i−Lwa+[2:2:Lwa]. That is, new pits are written at positions i−Lwa+2, i−Lwa+4, i−Lwa+6, etc., up to (but not exceeding) position i. Thus a new pit is written every two bit positions in the write area to give an alternating pattern of "1's" (pits) and "0's" (no-pits). If, however, Lwa is determined to be odd at step 73, then in step 75 new pits are written at positions i−Lwa+[1:2:Lwa]. Thus pits are again written every two positions in the write area up to position i, but starting this time with position i−Lwa+1. From step 74 or 75, operation continues to step 76. Here, the write area indicator is unset (wa=0), and Lwa is set to zero, signifying that the write area is complete, and operation proceeds to step 69.

If, in any pass of step 64, $b_i=1$ for a bit position outside a write area (wa=0), then since Lwa=0, operation will pass via step 73 to step 74. In this case, a new pit will be written only at position i−Lwa+Lwa, i.e. the current position i, this being the only write position allowed by the formula. When the last bit position in the series is eventually reached, i.e. i=n−1 at step 69, then in step 78 controller 6 checks whether the write area indicator wa is currently set. If not, no action is required and the overwrite process is complete. If wa=1, however, then the following steps 79, 80 and 81 correspond generally to steps 73, 74 and 75 described above. Here, however, new pits are written in the write area at positions n−Lwa+[2:2:Lwa] (step 80), or n−Lwa+[1:2:Lwa] (step 81), since the last position of the write area is the spare bit position n. The overwrite process is then complete.

FIG. 8 demonstrates operation of this embodiment by way of a worked example similar to that of FIG. 3. Consideration of this figure in conjunction with FIG. 7 shows that, in this embodiment, the conditions for writing a new pit (W) are as follows:

for a current bit position which is not in a write area, a new pit is written at the current position if a coded bit $b_i$ of value "1" is to be recorded at that position; and for the set of bit positions in a write area, a new pit is written at least every two bit positions starting within the first two positions of the write area and ending with the writing of a new pit in the last position of the write area.

Equally, the condition for reading (R) a current bit position in the series (after the initialization positions i=0, i=1) is that both:

(a) a coded bit $b_i$ of value "0" is to be recorded at the current position, and (b) the write area indicator is unset.

As demonstrated in FIG. 8, once the last new pit has been written at the spare bit position i=16, the bit sequence recorded at the series of bit positions i=0 to 15 is the original coded $b_i$-sequence.

Figure 9:
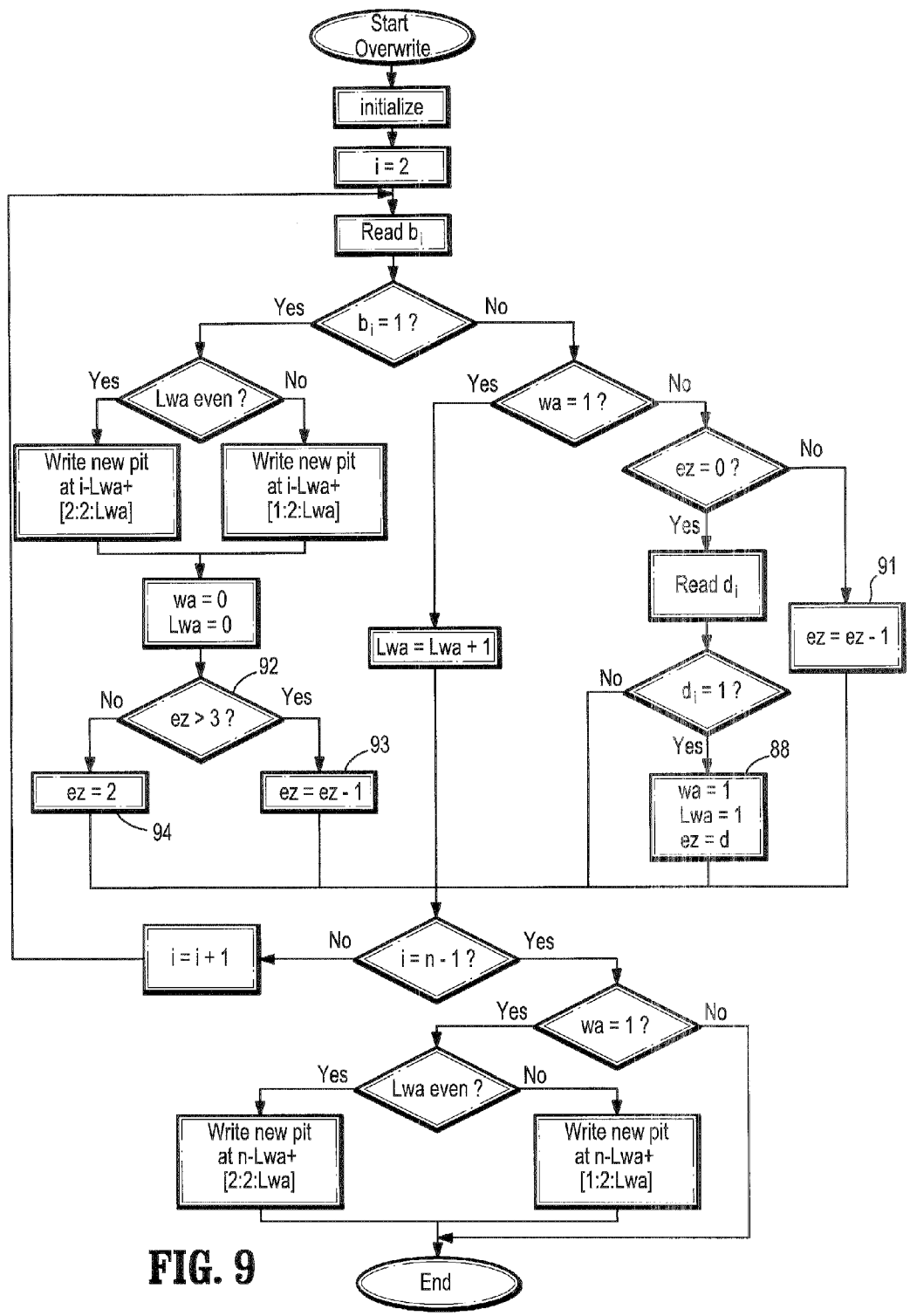
FIG. 9 is a flow chart illustrating a fourth overwrite method according to an embodiment of the present invention.

The above embodiment can also be modified to include one or more of the read-saving measures described in relation to the earlier embodiments. Thus, for example, reads (R) can be excluded for bit positions within r=2 positions following the position at which a coded bit $b_i$ of value "1" is to be recorded. In addition, reads (R) can be excluded for bit positions within d bit positions following the position at which an old pit ($d_i$=1) has been identified by reading. As before, since bit positions in write areas are not read anyway in the current embodiment, these read-savings apply to positions outside write areas. The flow chart of FIG. 9 shows an embodiment based on FIG. 7 but modified to incorporate both of these read savings, with r=2 and a general value of d>3. The FIG. 9 flow chart corresponds to that of FIG. 7 but with a modified step 88 and additional steps 91 to 94 to incorporate the concept of an exclusion zone. Steps 88 and 91 to 94 here correspond respectively to steps 38 and 41 to 44 in FIG. 5 which incorporate the exclusion zone in the earlier embodiment, and have the equivalent effect in this embodiment. Since r=2 here, however, decision step 92 checks whether ez>3 and step 94 sets ez=2.

With the modifications of FIG. 9, it can be seen that the condition for reading a current bit position in the series is that:

(a) a coded bit of value "0" is to be recorded at the current position; and (b) the current position is not within r=2 positions following the position at which a coded bit of value "1" is to be recorded, and not within d bit positions of a pit identified by reading a previous position; and (c) the write area indicator is unset.

Thus, compared to the read/write process of FIG. 8, the modifications in FIG. 9 eliminate the reads (R) at bit positions i=6, 7, 10, 11, 13 and 14.

While FIGS. 7 and 9 provide simple and efficient overwrite systems, again a further read-saving can be made by exploiting the effect of the r-constraint on bit positions preceding a write operation W. Since r=2 here, if a new pit is to be written (W) at a given bit position, then the previous two bit positions i−2 and i−1 need not be read since they will always contain "0"s after the write W at position i. Again, this additional read-saving applies to bit positions outside write areas since positions in a write area are not read in the above embodiments. FIG. 10 shows the read/write process for the same data as FIG. 8, but including this modification in addition to the read-saving measures of FIG. 9. This modification additionally eliminates the read R at bit position i=8, and thus prevents a write area being defined for position i=9. Thus, while the final result of the overwrite operation is unchanged, reads R are only required at positions i=0 and 15. These reads are sufficient to locate all of the excess pits. In this example, the only excess pits are those at positions i=0 and 15 which are positively identified by reading these bit positions. By using appropriate write patterns in the write areas defined during the read/write progression, the excess pits are erased and the only pits remaining after the overwrite operation are those at the required positions where $b_i$=1.

Note that, while an alternating pattern of "1's" (pits) and "0's" (no-pits) is used as a particularly simple write pattern in write areas of the r=2 embodiments just described, other write patterns are possible. For example, in the write area from i=1 to i=5 of FIG. 8, writes W performed at positions i=2, 4 and 5, or positions i=2, 3 and 5, would also serve to erase the excess pit at i=0 while leaving only a pit at the required position of the $b_i$=1 at i=5. Also, while these alternative write patterns achieve the desired result with the minimum possible number of writes W, additional writes could be employed in the write pattern if power expenditure is not critical. In general, for any given value of r, the condition for writing new pits (W) in a write area is that all of the following are satisfied:

(a) a new pit is written within the first r positions of the write area, (b) a new pit is written in the last position of the write area, and (c) any new pit written in other than the last position of the write area is erased by another new pit written in the write area.

These conditions ensure that all excess pits will be erased as required, and also that a pit remains in the last position of a write area. Except where this last position is the spare bit position n, this last position corresponds to that at which a coded bit $b_i$ of value "1" is to be recorded, so the pit remaining at this position is correct.

In the above embodiments, for bit positions outside a write area, the condition for writing a new pit at a bit position is that a coded bit $b_i$ of value "1" is to be recorded at that position. However in other embodiments, new pits may not need to be written at all these positions. For example, if reads R were performed at these positions, then a new pit would not need to be written if an old pit already existed at that position (i.e. $b_i$=1 and $d_i$=1). In general, for embodiments where read/write decisions are made at each bit position in turn, the requirement for locating all excess pits will be met provided that, for each bit position in the series i=0 to n−1, the current bit position is read at least if all the following conditions are satisfied:

(a) a coded bit $b_i$ of value "0" is to be recorded at the current position; and (b) the current position is not within r bit positions of the position at which a coded bit $b_i$ of value "1" is to be recorded, and not within d bit positions of a pit identified by reading a previous position; and (c) the write area indicator is unset.

Embodiments might of course be envisaged where the write area system is not employed, and/or where the reading of a bit position can be performed other than when a single probe reaches that position in the write sequence. Whatever method is employed, at least sufficient of the old bit sequence $d_i$ must be read to locate all excess pits as explained above. With regard to the writing of new pits (W), in general terms new pits must be written at sufficient positions in the series that the following conditions are satisfied:

(a) any excess pit in the old bit sequence is erased by writing a new pit;

(b) a pit remains at each position at which a coded bit $b_i$ of value "1" is to be recorded; and (c) any new pit written at a position in said series other than a position at which a coded bit $b_i$ of value "1" is to be recorded is erased by writing another new pit.

In overwrite methods according to an embodiment of the present invention, the number of reads (R) and writes (W) performed in operation will depend on the statistics of the original input data, the particular input data coding process employed, and the relative positions of the "1's" in the old and new data sequences. However, the power expenditure with overwrite methods according to an embodiment of the present invention can be even less than that required for methods disclosed in our earlier European applications referenced above. This is demonstrated by the following analysis.

In a first example, the power dissipation in the basic embodiment of FIGS. 2 and 3 above will be compared to an overwrite method disclosed in our European application no. 02010648.0. That application describes two basic overwrite methods referred to in the application as "Method 1" and "Method 2", with Method 2 involving lower power dissipation. The following analysis compares the FIG. 2 embodiment above with Method 2 of the earlier application.

The following terminology is used:
N is the number of encoded bits $b_i$
$N_{code}$ is the number of "1's" in the encoded bits $b_i$
$N_{method2}$ is the number of writes (single-pit write operations) with Method 2
$N_w$ is the number of writes (W) with the FIG. 2 method
$N_r$ is the number of reads (R) with the FIG. 2 method
$P_r$ is the power required to read a bit
$P_w$ is the power required to write a "1" bit Based on the above definitions, the total power dissipation reduction of the FIG. 2 method over Method 2 is given by:

$$1 - \frac{(N_w) + (N_r)\left(\frac{P_r}{P_w}\right)}{(N_{method2})}$$

Figures 11, 12:
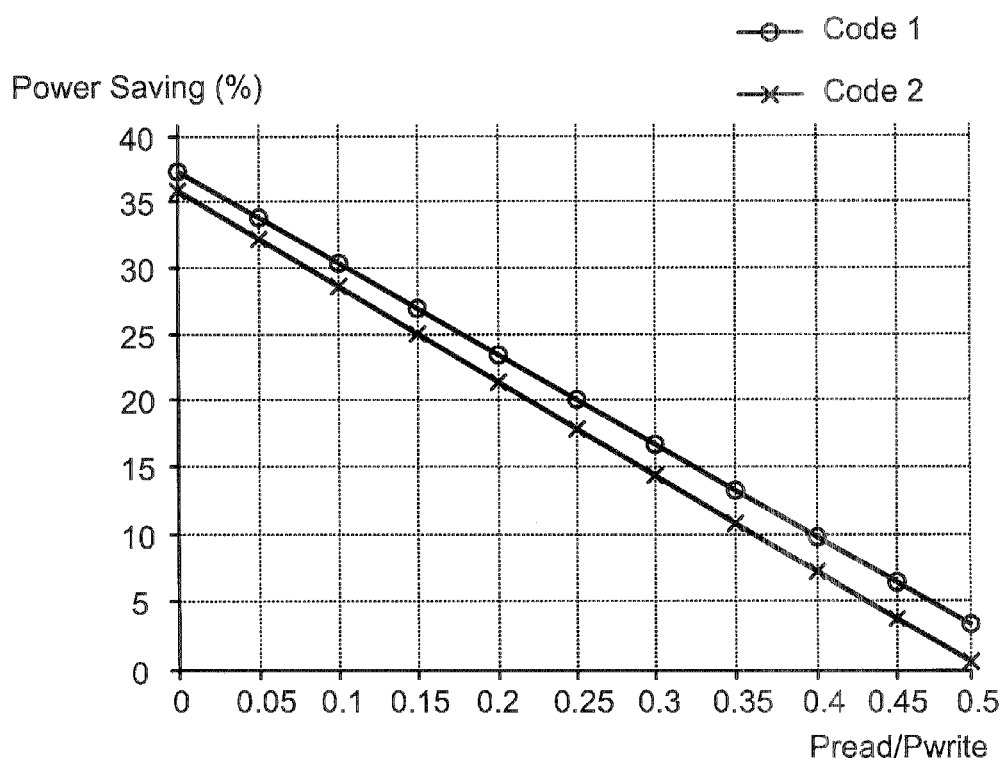
FIG. 11 is a table of parameters used in power analysis of the FIG. 2 method.
FIG. 12 is a graph illustrating power saving with the FIG. 2 method compared to earlier overwrite methods.

The table of FIG. 11 contains averages of the above quantities normalized to the total number of encoded bits. These averages are over 100 overwrite runs, in each of which 1024 bytes of user data are encoded, recorded on the storage surface, and then overwritten by a different set of 1024 bytes of user data. Thus a total of 1.6 Mbits (with a 1/2 code-rate) are used in the averaging statistics. The three (d, k) codes used are those detailed in application no. 02010648.0. Based on these figures, the graph of FIG. 12 shows the power dissipation reduction (in percent) for the two (2, 10) codes, and for a range of $(P_r/P_w)$ values. This demonstrates that, for typical read and write operational power requirements, the FIG. 2 method requires less power than Method 2 of our earlier application. For example, if $P_r = 0.25\ P_w$, the new overwrite method decreases the total power dissipation by 20% compared to Method 2. Similar analysis shows that the new overwrite method decreases the total power dissipation by 40% compared to Method 1 of our earlier application.

As a second example, the power dissipation in the r=2 embodiment of FIGS. 7 and 8 above will be compared to an overwrite method as disclosed in our European application no. 02405541.0 for which d=2. This latter method, referred to hereinafter as "Method 3", requires even less power than Method 2 discussed above. The following additional parameters are defined:

$N_{method3}$ is the number of writes (single-pit write operations) with Method 3
$N_{w2}$ is the number of writes (W) with the method of FIG. 7
$N_{r2}$ is the number of reads (R) with the method of FIG. 7

The total power dissipation reduction of the FIG. 7 method over Method 3 is given by:

$$1 - \frac{(N_{w2}) + (N_{r2})\left(\frac{P_r}{P_w}\right)}{(N_{method3})}$$

Figures 13, 14:
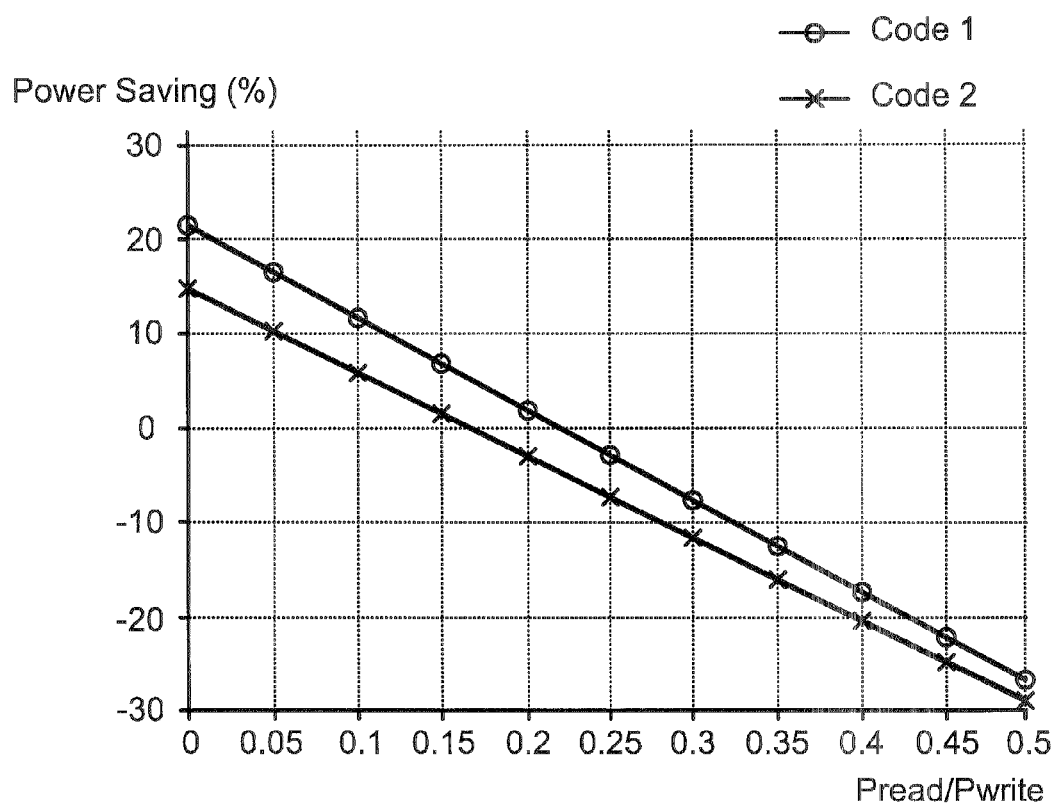
FIG. 13 is a table of parameters used in power analysis of the FIG. 7 method.
FIG. 14 is a graph illustrating power saving with the FIG. 7 method.

The table of FIG. 13 contains averages of the above quantities normalized to the total number of encoded bits. As before, 1.6 Mbits (with an 8/16 code rate) are used to obtain the averaging statistics, the two (2, 10) codes being as in FIG. 11. FIG. 14 shows the power reduction for the two (2, 10) codes for different values of values of $(P_r/P_w)$. This demonstrates that, even though Method 3 is itself a very low-power method, for particular read and write operational power requirements the FIG. 7 method requires even less power than Method 3. In particular, when $P_r/P_w < 0.2$ the FIG. 7 method provides reduced power dissipation.

It will be seen that highly efficient overwrite methods are provided by the embodiments described above. However, many modifications can be made to the particular embodiments described. For example, while the storage device 1 employs a Millipede probe storage array in the embodiments described, different probe mechanisms may be employed in other probe-based storage devices according to embodiments of the present invention. Also, while the specific embodiments described employ (d, k) codes, in general any coding scheme imposing a d≥r constraint could be employed for the initial coding of the input data. Further, in the above examples x=1 input data coding process whereby the d-constraint applies to the number of zeros allowed between "1's". Other embodiments could apply x=0 input data coding, so that the d-constraint applies to the number of "1's" allowed between zeros. Either way, a bit of value $\bar{x}$ in the coded input data corresponds to a pit recorded on the storage surface, a bit of value x corresponding to "no-pit". Many other changes and modifications can be made to the embodiments described without departing from the scope of the invention.

What is claimed is:

1. A method for overwriting data in a storage device, wherein data bits are represented by at least one of a presence and an absence of pits formed at a plurality of bit positions on a storage surface, the plurality of bit positions being spaced such that writing a pit at each bit position can cause a previously-written pit within r bit positions to be erased, where r is a predetermined number ≥1, the method comprising:

coding data such that successive bits of a value x in a coded bit sequence are separated by at least d bits of value $\bar{x}$, where d is a predetermined number ≥r;

reading an amount of an old bit sequence to be overwritten by the coded bit sequence sufficient to locate at least one excess pit, wherein each excess pit is a pit not within r bit positions of a bit position where a coded bit of the value x is to be recorded;

writing, at respective bit positions, each pit required to erase each excess pit in the old bit sequence; and writing, at respective bit positions, each pit required to maintain a pit at each bit position where the coded bit of the value x is to be recorded.

2. The method as recited in claim 1, further comprising:

reading an amount of the old bit sequence sufficient to identify at least a second excess pit not located in a set of bit positions immediately following a first excess pit and ending with at least one of a first occurrence of a bit position where the coded bit of the value x is to be recorded and a bit position after a last bit position in a series of bit positions in which the coded bit sequence is to be recorded;

defining a write area as a set of bit positions immediately following the second excess pit;

writing a pit at least one of within the first r positions of the write area, and in a last bit position of the write area; and erasing a first pit not written in the last bit position of the write area with a second pit written in the write area.

3. The method as recited in claim 2, further comprising writing a pit at at least one bit position not in the write area where the coded bit of the value x is to be recorded.

4. The method as recited in claim 2, further comprising:

reading a current bit position if a coded bit of the value $\bar{x}$ is to be recorded at the current bit position, the current bit position is not within r bit positions of a bit position where the coded bit of the value x is to be recorded, and not within d bit positions of a pit identified by reading a previous bit position, and a write area indicator is unset;

setting the write area indicator for a next bit position if a pit is identified by reading the current bit position; and unsetting the write area indicator for the next bit position when a pit is written in the last bit position of the write area.

5. The method as recited on claim 4, wherein, when the write area indicator is set, the write area indicator indicates that the current bit position is in the write area.

6. The method as recited in claim 4, wherein r=1, the method further comprising writing a pit at the current bit position if at least one of the coded bit of the value x is to be recorded at the current bit position, and the write area indicator is set.

7. The method as recited in claim 6, wherein the step of writing the pit at the current bit position occurs for bit positions up to a position after the last bit position in the series of bit positions.

8. The method as recited in claim 6, further comprising reading the current bit position if the coded bit of the value $\bar{x}$ is to be recorded at the current bit position, and the write area indicator is unset.

9. The method as recited in claim 6, further comprising reading the current bit position if the coded bit of the value $\bar{x}$ is to be recorded at the current bit position, the current bit position is not a position after a position where the coded bit of the value x is to be recorded, and not within d bit positions of a pit identified by reading a previous bit position, and the write area indicator is unset.

10. The method as recited in claim 4, wherein r=2, the method further comprising:

writing, for the current bit position not in the write area, a pit at the current bit position if the coded bit of the value x is to be recorded at the current bit position; and writing, for the set of bit positions in the write area, a pit at least every two bit positions starting with at least one of a first bit position and a second bit position of the write area and ending with the last bit position of the write area.

11. The method as recited in claim 10, further comprising reading, after a second bit position in the series of bit positions, the current bit position if the coded bit of the value $\bar{x}$ is to be recorded at the current bit position, and the write area indicator is unset.

12. The method as recited in claim 10, further comprising reading, after a second bit position in the series of bit positions, the current bit position if the coded bit of the value $\bar{x}$ is to be recorded at the current bit position, the current bit position is not within two bit positions following a bit position where the coded bit of the value x is to be recorded, and not within d bit positions of a pit identified by reading a previous bit position, and the write area indicator is unset.

13. The method as recited in claim 1, wherein r=1.

14. The method as recited in claim 13, wherein d=1.

15. The method as recited in claim 1, wherein r=2.

16. The method as recited in claim 15, wherein d=2.

17. The method as recited in claim 1, wherein x=1.

18. The method as recited in claim 1, further comprising writing, at respective bit positions, each pit required to erase each pit written at a bit position where the coded bit of the value x is not to be recorded.

19. The method as recited in claim 1, wherein each pit is formed in the storage surface by a probe mechanism of the storage device.

20. An apparatus for controlling overwriting of data in a data storage device wherein data bits are represented by at least one of a presence and an absence of pits formed at a plurality of bit positions on a storage surface, the plurality of bit positions being spaced such that writing a pit at each bit position can cause a previously-written pit within r bit positions to be erased, where r is a predetermined number $\geq 1$, the apparatus comprising:

a coder for coding data to be stored in the data storage device such that successive bits of a value x in a coded bit sequence are separated by at least d bits of value $\bar{x}$, where d is a predetermined number $\geq r$; and a controller for controlling reading and writing of the data, wherein:

the controller effects reading of an amount of an old bit sequence to be overwritten by the coded bit sequence sufficient to locate at least one excess pit, wherein each excess pit is a pit not within r bit positions of a bit position where a coded bit of the value x is to be recorded;

the controller effects writing, at respective bit positions, of each pit required to erase each excess pit in the old bit sequence; and the controller effects writing, at respective bit positions, of each pit required to maintain a pit at each bit position where the coded bit of the value x is to be recorded.

21. The apparatus as recited in claim 20, wherein:

the controller effects reading of an amount of the old bit sequence sufficient to identify at least a second excess pit not located in a set of bit positions immediately following a first excess pit and ending with at least one of a first occurrence of a bit position where the coded bit of the value x is to be recorded and a bit position after a last bit position in a series of bit positions in which the coded bit sequence is to be recorded;

the controller effects defining of a write area as a set of bit positions immediately following the second excess pit;

the controller effects writing of a pits at least one of within the first r positions of the write area, and in a last bit position of the write area; and the controller effects erasing of a first pit not written in the last bit position of the write area with a second pit written in the write area.

22. The apparatus as recited in claim 21, wherein the controller effects writing of a pit at at least one bit position not in the write area where the coded bit of the value x is to be recorded.

23. The apparatus as recited in claim 21, wherein:

the controller effects reading of a current bit position if a coded bit of the value $\bar{x}$ is to be recorded at the current bit position, the current bit position is not within r bit positions of a bit position where the coded bit of the value x is to be recorded, and not within d bit positions of a pit identified by reading a previous bit position, and a write area indicator is unset;

the controller sets the write area indicator for a next bit position if a pit is identified by reading the current bit position; and the controller unsets the write area indicator for the next bit position when a pit is written in the last bit position of the write area.

24. The apparatus as recited in claim 23, wherein, when the write area indicator is set, the write area indicator indicates that the current bit position is in the write area.

25. The apparatus as recited in claim 23, wherein r=1 and the controller effects writing of a pit at the current bit position if at least one of the coded bit of the value x is to be recorded at the current bit position, and the write area indicator is set.

26. The apparatus as recited in claim 25, wherein the controller effects writing of the pit at the current bit position for bit positions up to a position after the last bit position in the series of bit positions.

27. The apparatus as recited in claim 25, wherein the controller effects reading of the current bit position if the coded bit of the value $\bar{x}$ is to be recorded at the current bit position, and the write area indicator is unset.

28. The apparatus as recited in claim 25, wherein the controller effects reading of the current bit position if the coded bit of the value $\bar{x}$ is to be recorded at the current bit position, the current bit position is not a position after a position where the coded bit of the value x is to be recorded, and not within d bit positions of a pit identified by reading a previous bit position, and the write area indicator is unset.

29. The apparatus as recited in claim 23, wherein:

r=2;

the controller effects writing, for the current bit position not in the write area, of a pit at the current bit position if the coded bit of the value x is to be recorded at the current bit position; and the controller effects writing, for the set of bit positions in the write area, of a pit at least every two bit positions starting with at least one of a first bit position and a second bit position of the write area and ending with the last bit position of the write area.

30. The apparatus as recited in claim 29, wherein the controller effects reading, after a second bit position in the series of bit positions, of the current bit position if the coded bit of the value $\bar{x}$ is to be recorded at the current bit position, and the write area indicator is unset.

31. The apparatus as recited in claim 29, wherein the controller effects reading, after a second bit position in the series of bit positions, of the current bit position if the coded bit of the value $\bar{x}$ is to be recorded at the current bit position, the current bit position is not within two bit positions following a bit position at which the coded bit of the value x is to be recorded, and not within d bit positions of a pit identified by reading a previous bit position, and the write area indicator is unset.

32. The apparatus as recited in claim 20, further comprising a decoder for decoding a coded bit sequence read from the storage surface, wherein the decoder implements an inverse of a code implemented by the coder.

33. The apparatus as recited in claim 20, wherein the controller effects writing, at respective bit positions, of each pit required to erase each pit written at a bit position where the coded bit of the value x is not to be recorded.

34. The apparatus as recited in claim 20, further comprising a probe mechanism for reading and writing the data.

35. A data storage device, comprising:

a storage surface;

a probe mechanism for reading data from the storage surface, and for recording data on the storage surface by forming pits at a plurality of bit positions on the storage surface, the plurality of bit positions being spaced such that writing a pit at each bit position can cause a previously-written pit within r bit positions to be erased, where r is a predetermined number $\geq 1$;

a coder for coding the data to be stored in the data storage device such that successive bits of a value x in a coded bit sequence are separated by at least d bits of value $\bar{x}$, where d is a predetermined number $\geq r$; and a controller for controlling reading and writing of the data by the probe mechanism, wherein:

the controller effects reading of an amount of an old bit sequence to be overwritten by the coded bit sequence sufficient to locate at least one excess pit, wherein each excess pit is a pit not within r bit positions of a bit position where a coded bit of the value x is to be recorded;

the controller effects writing, at respective bit positions, of each pit required to erase each excess pit in the old bit sequence;

the controller effects writing, at respective bit positions, of each pit required to maintain a pit at each bit position where the coded bit of the value x is to be recorded; and the controller effects writing, at respective bit positions, of each pit required to erase each pit written at a bit position where the coded bit of the value x is not to be recorded.

36. A program storage device readable by a machine, tangibly embodying a program of instructions executable by the machine to perform method steps for overwriting data in a storage device, wherein data bits are represented by at least one of a presence and an absence of pits formed at a plurality of bit positions on a storage surface, the plurality of bit positions being spaced such that writing a pit at each bit position can cause a previously-written pit within r bit positions to be erased, where r is a predetermined number $\geq 1$, the method steps comprising:

coding data such that successive bits of a value x in a coded bit sequence are separated by at least d bits of value $\bar{x}$, where d is a predetermined number $\geq r$;

reading an amount of an old bit sequence to be overwritten by the coded bit sequence sufficient to locate at least one excess pit, wherein each excess pit is a pit not within r bit positions of a bit position where a coded bit of the value x is to be recorded;
writing, at respective bit positions, each pit required to erase each excess pit in the old bit sequence; and
writing, at respective bit positions, each pit required to maintain a pit at each bit position where the coded bit of the value x is to be recorded.

37. The program storage device as recited in claim 36, further comprising instructions for performing the steps of:
reading an amount of the old bit sequence sufficient to identify at least a second excess pit not located in a set of bit positions immediately following a first excess pit and ending with at least one of a first occurrence of a bit position where the coded bit of the value x is to be recorded and a bit position after a last bit position in a series of bit positions in which the coded bit sequence is to be recorded;
defining a write area as a set of bit positions immediately following the second excess pit;
writing a pit at least one of within the first r positions of the write area, and in a last bit position of the write area; and
erasing a first pit not written in the last bit position of the write area with a second pit written in the write area.

38. The program storage device as recited in claim 37, further comprising instructions for writing a pit at at least one bit position not in the write area where the coded bit of the value x is to be recorded.

39. The program storage device as recited in claim 37, further comprising instructions for performing the steps of:
reading a current bit position if a coded bit of the value $\bar{x}$ is to be recorded at the current bit position, the current bit position is not within r bit positions of a bit position where the coded bit of the value x is to be recorded, and not within d bit positions of a pit identified by reading a previous bit position, and a write area indicator is unset;
setting the write area indicator for a next bit position if a pit is identified by reading the current bit position; and
unsetting the write area indicator for the next bit position when a pit is written in the last bit position of the write area.

40. The program storage device as recited on claim 39, wherein, when the write area indicator is set, the write area indicator indicates that the current bit position is in the write area.

41. The program storage device as recited in claim 39, wherein r=1, and further comprising instructions for writing a pit at the current bit position if at least one of the coded bit of the value x is to be recorded at the current bit position, and the write area indicator is set.

42. The program storage device as recited in claim 41, wherein the step of writing the pit at the current bit position occurs for bit positions up to a position after the last bit position in the series of bit positions.

43. The program storage device as recited in claim 41, further comprising instructions for reading the current bit position if the coded bit of the value $\bar{x}$ is to be recorded at the current bit position, and the write area indicator is unset.

44. The program storage device as recited in claim 41, further comprising instructions for reading the current bit position if the coded bit of the value $\bar{x}$ is to be recorded at the current bit position, the current bit position is not a position after a position where the coded bit of the value x is to be recorded, and not within d bit positions of a pit identified by reading a previous bit position, and the write area indicator is unset.

45. The program storage device as recited in claim 39, wherein r=2, and further comprising instructions for performing the steps of:
writing, for the current bit position not in the write area, a pit at the current bit position if the coded bit of the value x is to be recorded at the current bit position; and
writing, for the set of bit positions in the write area, a pit at least every two bit positions starting with at least one of a first bit position and a second bit position of the write area and ending with the last bit position of the write area.

46. The program storage device as recited in claim 45, further comprising instructions for reading, after a second bit position in the series of bit positions, the current bit position if the coded bit of the value $\bar{x}$ is to be recorded at the current bit position, and the write area indicator is unset.

47. The program storage device as recited in claim 45, further comprising instructions for reading, after a second bit position in the series of bit positions, the current bit position if the coded bit of the value $\bar{x}$ is to be recorded at the current bit position, the current bit position is not within two bit positions following a bit position where the coded bit of the value x is to be recorded, and not within d bit positions of a pit identified by reading a previous bit position, and the write area indicator is unset.

48. The program storage device as recited in claim 36, wherein r=1.

49. The program storage device as recited in claim 48, wherein d=1.

50. The program storage device as recited in claim 36, wherein r=2.

51. The program storage device as recited in claim 50, wherein d=2.

52. The program storage device as recited in claim 36, wherein x=1.

53. The program storage device as recited in claim 36, further comprising instructions for writing, at respective bit positions, each pit required to erase each pit written at a bit position where the coded bit of the value x is not to be recorded.

54. The program storage device as recited in claim 36, wherein each pit is formed in the storage surface by a probe mechanism of the storage device.

55. A system for controlling overwriting of data in a data storage device wherein data bits are represented by at least one of a presence and an absence of pits formed at a plurality of bit positions on a storage surface, the plurality of bit positions being spaced such that writing a pit at each bit position can cause a previously-written pit within r bit positions to be erased, where r is a predetermined number ≥1, the system comprising:
a coder for coding data to be stored in the data storage device such that successive bits of a value x in a coded bit sequence are separated by at least d bits of value $\bar{x}$, where d is a predetermined number ≥r; and
a controller for controlling reading and writing of the data, wherein:
the controller effects reading of an amount of an old bit sequence to be overwritten by the coded bit sequence sufficient to locate at least one excess pit, wherein each excess pit is a pit not within r bit positions of a bit position where a coded bit of the value x is to be recorded;

the controller effects writing, at respective bit positions, of each pit required to erase each excess pit in the old bit sequence;

the controller effects writing, at respective bit positions, of each pit required to maintain a pit at each bit position where the coded bit of the value x is to be recorded; and the controller effects writing, at respective bit positions, of each pit required to erase each pit written at a bit position where the coded bit of the value x is not to be recorded.

* * * * *